United States Patent
Vallejos Campos et al.

(10) Patent No.: US 11,368,769 B2
(45) Date of Patent: Jun. 21, 2022

(54) METHOD FOR DIMENSIONING A WDM OPTICAL NETWORK WITH WAVELENGTH CONTINUITY CONSTRAINT

(71) Applicant: UNIVERSIDAD TÉCNICA FEDERICO SANTA MARÍA, Valparaíso (CL)

(72) Inventors: Reinaldo Antonio Vallejos Campos, Valparaíso (CL); Nicolás Alonso Jara Carvallo, Valparaíso (CL)

(73) Assignee: UNIVERSIDAD TÉCNICA FEDERICO SANTA MARIA, Valparaíso (CL)

( * ) Notice: Subject to any disclaimer, the term of this patent is extended or adjusted under 35 U.S.C. 154(b) by 0 days.

(21) Appl. No.: 17/419,249

(22) PCT Filed: Nov. 26, 2019

(86) PCT No.: PCT/CL2019/050122
§ 371 (c)(1),
(2) Date: Jun. 28, 2021

(87) PCT Pub. No.: WO2020/132766
PCT Pub. Date: Jul. 2, 2020

(65) Prior Publication Data
US 2022/0078533 A1   Mar. 10, 2022

(30) Foreign Application Priority Data
Dec. 28, 2018  (CL) .................................. 3860-2018

(51) Int. Cl.
*H04Q 11/00* (2006.01)
*H04J 14/02* (2006.01)
*H04L 41/0893* (2022.01)

(52) U.S. Cl.
CPC ...... *H04Q 11/0066* (2013.01); *H04J 14/0227* (2013.01); *H04L 41/0893* (2013.01);
(Continued)

(58) Field of Classification Search
CPC .................................................. H04Q 11/0005
See application file for complete search history.

(56) References Cited

U.S. PATENT DOCUMENTS 7,315,517 B2  1/2008  El-Amawy et al.
8,693,871 B2  4/2014  De Carvalho Resende et al.
(Continued)

FOREIGN PATENT DOCUMENTS

EP    1943784 B1    2/2021

OTHER PUBLICATIONS

Mandal et al., "An Efficient Heuristic Search for Optimal Wavelength", Spring-Verlag, 2003 (Year: 2003).*
(Continued)

*Primary Examiner* — Shi K Li
(74) *Attorney, Agent, or Firm* — Procopio, Cory, Hargreaves & Savitch LLP

(57) ABSTRACT

The invention relates to a new method for jointly defining a policy for assigning wavelengths to each network connection and for calculating the number of wavelengths in dynamic WDM optical networks without wavelength conversion. To solve this problem, the method comprises including in each network connection a fixed route for transmitting, which is defined before operating the network. This new approach has two main differences from previous strategies.

6 Claims, 1 Drawing Sheet

(52) U.S. Cl.
CPC .............. *H04Q 2011/009* (2013.01); *H04Q 2011/0084* (2013.01); *H04Q 2011/0086* (2013.01)

(56) References Cited

U.S. PATENT DOCUMENTS

| | | |
|---|---|---|
| 9,060,215 B2 | 6/2015 | Miedema |
| 2018/0123724 A1* | 5/2018 | Zhang ................ H04J 14/0257 |
| 2018/0367236 A1 | 12/2018 | Zhang et al. |

OTHER PUBLICATIONS

Jara, N., et al., Blocking Evaluation and Wavelength Dimensioning of Dynamic WDM Networks without Wavelength Conversion, Journal of Optical Communications and Networking, 9(8), 2017, pp. 625-634.

Koganti, R.T., et al., Analysis of Routing and Wavelength Assignment in Large WDM Networks, Procedia Computer science, 2014, 34, pp. 71-78.

Ramaswami, R., et al., Optical Networks, A Practical Perspective, Third Edition, 2010, Elsevier Inc., 928 pgs.

Office Action for related CL App No. 2018-003860 dated Jun. 9, 2021, 6 pgs.

International Search Report and Written Opinion for related PCT App No. PCT/CL2019/050122 dated Mar. 24, 2020, 9 pgs. (partial translation).

\* cited by examiner

METHOD FOR DIMENSIONING A WDM OPTICAL NETWORK WITH WAVELENGTH CONTINUITY CONSTRAINT

CROSS-REFERENCE TO RELATED APPLICATIONS

This application is a U.S. National Stage entry of PCT Application No: PCT/CL2019/050122 filed Nov. 26, 2019, which claims priority to Chilean Application No: 3860-2018 filed Dec. 28, 2018, the contents of which are incorporated herein by reference.

TECHNICAL FIELD OF THE INVENTION

This invention relates to the field of optical networks, in particular to WDM optical networks with wavelength continuity constraint and specifically provides a method for calculating the capacity of a WDM optical network with wavelength continuity constraint.

BACKGROUND OF THE INVENTION

A central problem with WDM optical networks is knowing how many wavelengths must be assigned to the network links. Finding the number of wavelengths of the links is known as "Wavelength Dimensioning" (WD) problem. The number of wavelengths significantly impacts the network cost, as it determines how many infrastructure resources are needed in the network to achieve the desired network performance. Therefore, an efficient dimensioning of every link in an optical network is of great importance.

In order to achieve an efficient wavelength dimensioning in dynamic networks, two contradictory objectives must be satisfied. On the one hand, it is desirable to reduce the infrastructure cost and, therefore, the network cost; on the other hand, it is necessary to guarantee a certain level of Quality of Service (QoS) to network users, measured by the blocking probability of each user. In other words, the network is designed to offer a very low blocking probability to each user (a value close to 0) and, at the same time, to save significant network resources. Solving this problem on dynamic WDM optical networks is especially difficult when the network does not have wavelength conversion capabilities. This lack of wavelength conversion means that, when a connection demands to transmit, the same wavelength must be available on every link belonging to the given connection path (end-to-end). This is known as the wavelength continuity constraint.

In order to solve the wavelength dimensioning problem in dynamic networks without wavelength conversion, several studies have been proposed so far. For example, the book "Optical Networks: A Practical Perspective", by Ramaswami et. al., 3$^{rd}$ Edition, Morgan Kaufmann Publishers Inc., San Francisco, Calif., USA, 2009, presents a collection of these studies. Among them the homogeneous dimensioning is the most common method used to date. However, this procedure produces an over-dimension of the network and, consequently, a loss of efficiency.

To solve the wavelength dimensioning problem, it is necessary to define which wavelength is going to be used by each connection (also called "user") every time they request to transmit, known as the "Wavelength Assignment" (WA) problem. It should be noted that the chosen wavelength may change over time, as every time the user requests resources to send data, the WA method searches for an available wavelength on the user's path links.

This problem has been vastly covered by previous works. Some of the most common heuristics proposed in the literature to solve the WA problem are: First-Fit (FF), Random Fit (RF), Most-Used (MU), and Least-Used-Use (LU), among others. First-Fit is the most common and fastest method used to date, as can be seen in the article "Analysis of Routing and Wavelength Assignment in Large WDM Networks" by R. T. Koganti and D. Sidhu, in Procedia Computer Science, vol. 34, pp. 71-78, 2014.

A longstanding problem in optical networks has been to provide a certain quality of communication to the network connections, despite the existence of different classes of users. This multi-class traffic occurs due to different priority users (or quality of service requirements), or some mechanisms to intentionally remove non-conforming bursts to improve network performance. However, the usual wavelength assignment and dimensioning approach (First-Fit wavelength assignment with a homogeneous dimensioning procedure) does not take these issues into account. For example, the First-Fit wavelength assignment scheme does not consider classes of users, as it simply searches sequentially for an available wavelength, without making any class distinction. On the other hand, in homogeneous dimensioning, the number of wavelengths assigned to network links is usually defined by the class of user with the strictest quality of service (QoS) requirement, thus providing the classes with a lower priority, a better quality of service than the one requested on its SLA.

U.S. Pat. No. 9,060,215 discloses a genetic algorithm for solving routing and wavelength assignment in optical networks having dynamic wavelength routing. The method proposes an iterative method, based on genetic algorithms. The network operator can choose the fitness function to find a good solution based on any criteria defined by the network operator.

U.S. Pat. No. 8,693,871 discloses a method for solving routing and wavelength assignment. This method seeks to minimize the number of wavelengths used, as a function of a bin-packing problem solution, seeking to solve the minimum number of bins, wherein the wavelengths are bins. This method assigns the wavelengths with the new versions of the First-Fit, Best-Fit, First-Fit-Decreasing, and Best-Fit Decreasing methods, using trays. This method does not take the quality of service offered to each user into account and uses a homogeneous dimensioning algorithm.

SUMMARY OF THE INVENTION

The present invention provides a method for implementing a WDM optical network with wavelength continuity constraint that is based on a definition of a policy for assigning wavelengths to each network connection, and on a calculation of the number of wavelengths in WDM dynamic optical networks with wavelength continuity restriction.

The present invention provides a method for implementing a WDM optical network with wavelength continuity constraint characterized in that it comprises the steps of:
  obtaining, in a processor, the topology of said WDM optical network, said topology including nodes and links in said optical network;
  obtaining, in said processor, a set of connections in said WDM optical network and a set of threshold values for each connection of said set of connections;
  obtaining, by means of said processor, a set of routes that allow satisfying said set of connections in said topology of said WDM optical network;

determining, by means of said processor, a set of numbers of wavelengths for each link of said topology, wherein said number of wavelengths is determined in such a way that, for each connection of said set of connections, a blocking probability value corresponding to said connection is lower than the threshold value corresponding to said connection; and implementing said optical network according to said set of numbers of wavelengths.

In a preferred embodiment, the method is characterized in that said set of numbers of wavelengths is determined by the steps of:

starting each link with a number of wavelengths equal to 1;

determining, by means of said processor, the blocking probability for each connection;

determining, by means of said processor, for each link, if the blocking probability corresponding to each of the connections using said link is lower than the threshold value corresponding to said connection;

increasing by 1 the number of wavelengths corresponding to a link if there is a connection that uses said link where the blocking probability is higher than its corresponding threshold value; and iteratively repeating the three previous steps.

In a more preferred embodiment, the method is characterized in that it further comprises storing the number of wavelengths required for each connection of said set of connections. In another more preferred embodiment, the method is characterized in that it further comprises storing the number of wavelengths required for each link of said optical network.

In a preferred embodiment, the method is characterized in that said set of routes is determined using Dijkstra's algorithm.

In another preferred embodiment, the method is characterized in that, for determining said blocking probability, said processor executes the steps of:

defining a plurality of layers, each layer corresponding to the topology of said optical network, wherein the number of wavelengths available in each link is 0 or 1;

determining, for each link of said optical network, the connections using said link;

defining, for each connection using said link, a first numerical value, $t_{ON,c}$, corresponding to the time in which said connection is active, and a second numerical value, $t_{OFF,c}$, corresponding to the time in which said connection is inactive;

defining a plurality of values $BL_{c,\ell}^w$ corresponding to the blocking probability of connection c on link l in layer w; and obtaining a value $BP_c$ corresponding to the blocking probability of connection c in the network.

In a more preferred embodiment, the method is characterized in that for said steps of defining a value $BL_{c,\ell}^w$ and obtaining a value $BP_c$, these are performed iteratively.

DETAILED DESCRIPTION OF THE INVENTION

The invention will now be described in detail, referencing to this end the figures accompanying the present application.

The present invention provides a method for implementing a WDM optical network with wavelength continuity constraint that comprises, essentially, the steps of:

obtaining, in a processor, the topology of said WDM optical network, said topology including nodes and links in said optical network;

obtaining, in said processor, a set of connections in said WDM optical network and a set of threshold values for each connection of said set of connections;

obtaining, by means of said processor, a set of routes that allow satisfying said set of connections in said topology of said WDM optical network;

determining, by means of said processor, a set of numbers of wavelengths for each link of said topology, wherein said number of wavelengths is determined in such a way that, for each connection of said set of connections, a blocking probability value corresponding to said connection is lower than the threshold value corresponding to said connection; and implementing said optical network according to said set of numbers of wavelengths.

Figure 1:
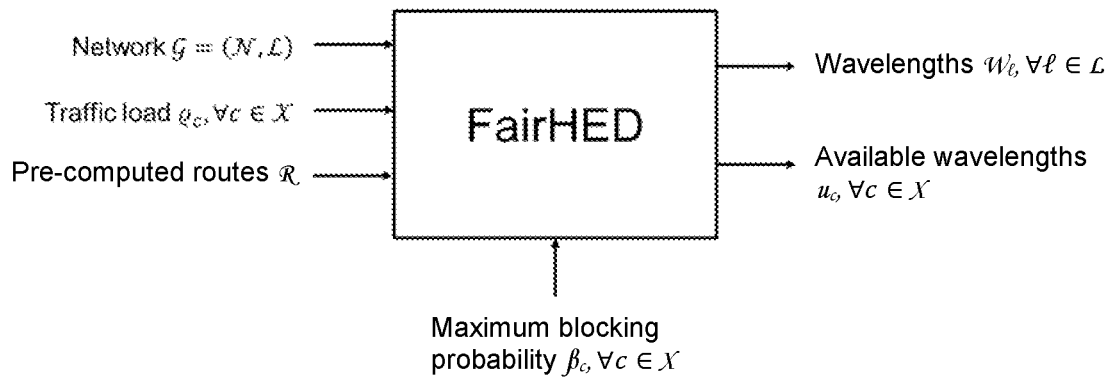
FIG. 1 shows an input and output diagram of a first embodiment of the method that is the object of the present invention.

As illustrated schematically in FIG. 1, the method that is the object of the present invention, in a preferred embodiment and without limiting the scope of the present invention, can be understood, in terms of block diagrams, as a block whose inputs are the topology of the network, represented as a graph $\mathcal{G}=(\mathcal{N}, \mathcal{L})$ where $\mathcal{N}$ is the set of nodes and $\mathcal{L}$ is the set of network links; the traffic load, $\varrho_c$, for each connection c defined in said optical network, and a set of pre-computed routes $\mathcal{R}$, which allow to implement the connections, c. Additionally, the values $\beta_c$ are considered as input to the method, wherein $\beta_c$ is the maximum blocking probability for connection c, and corresponds, interchangeably, with the threshold value corresponding to connection c. As outputs of the block, in this preferred embodiment and without limiting the scope of the present invention, the number of wavelengths for each link, $W_\ell$, and the maximum number of wavelengths for each connection, $u_c$, are obtained. The method is referred to, schematically and without limiting the scope of the present invention, as a "Fair Assignment-based Heterogeneous Wavelength Dimensioning" (FairHED) method.

Said block can be implemented, for example and without limiting the scope of the present invention, by means of a processor configured to perform the method that is the object of the present invention. The manner in which said processor obtains and executes the instructions that allow it to execute the method that is the object of the present invention does not limit the scope of the present invention. For example, and without limiting the scope of the present invention, said instructions may be stored in a storage device operatively coupled to said processor. Said storage device may be internal or external to said processor without limiting the scope of the present invention. However, in other embodiments, said processor may obtain said instructions remotely, for example and without limiting the scope of the present invention, by means of a local area data network, or a wide area data network, such as the internet. In an exemplary embodiment, without limiting the scope of the present invention, said instructions may be coded in an ad-hoc programming language, and said processor may be configured to compile and execute said instructions. However, in other embodiments, said instructions may be in a format executable by said processor and said processor may be configured to execute said instructions.

Hereinafter, without limiting the scope of the present invention, it will be understood that the steps of the method that is the object of the present invention are implemented by said processor, unless it is explicitly indicated or understood from the context that they are implemented by another device.

The method that is the object of the present invention comprises the step of obtaining, in said processor, the topology of said WDM optical network, said topology including nodes and links in said optical network and that, as mentioned above, may be represented, without limiting the scope of the present invention, by means of a graph $\mathcal{G}=(\mathcal{N}, \mathcal{L})$ where $\mathcal{N}$ is the set of nodes and $\mathcal{L}$ is the set of network links; and the step of obtaining, in said processor, a set of connections in said WDM optical network and a set of threshold values for each connection of said set of connections. Illustratively, without limiting the scope of the present invention, said set of connections will be denoted as set X and each connection of said set of connections as connection c. On the other hand, said set of threshold values, as previously mentioned and without limiting the scope of the present invention, correspond interchangeably with a maximum blocking probability of connection c and are denoted as $\beta_c$.

The manner in which said processor obtains said topology, said set of connections, or said set of threshold values does not limit the scope of the present invention and will depend on the specific manner in which the method that is the object of the present invention is implemented. For example, and without limiting the scope of the present invention, said processor may be operatively coupled to a graphical interface that allows defining said topology of said optical network, as well as said connections c and said threshold values $\beta_c$. However, in other preferred embodiments, said processor may obtain said objects by means of a set of data representing said topology of said network, said set of connections or said threshold values, $\beta_c$, without limiting the scope of the present invention.

On the other hand, as previously indicated, in a preferred embodiment, the set of routes $\mathcal{R}$ is an input of the method that is the object of the present invention. However, in other preferred embodiments, without limiting the scope of the present invention, said processor may be configured to obtain said set of routes $\mathcal{R}$ from the topology of the optical network that is to be implemented. In order to obtain said set $\mathcal{R}$, said processor may use of any method known in the state of the art, for example, and without limiting the scope of the present invention, by means of the Dijkstra algorithm.

Figure 2:
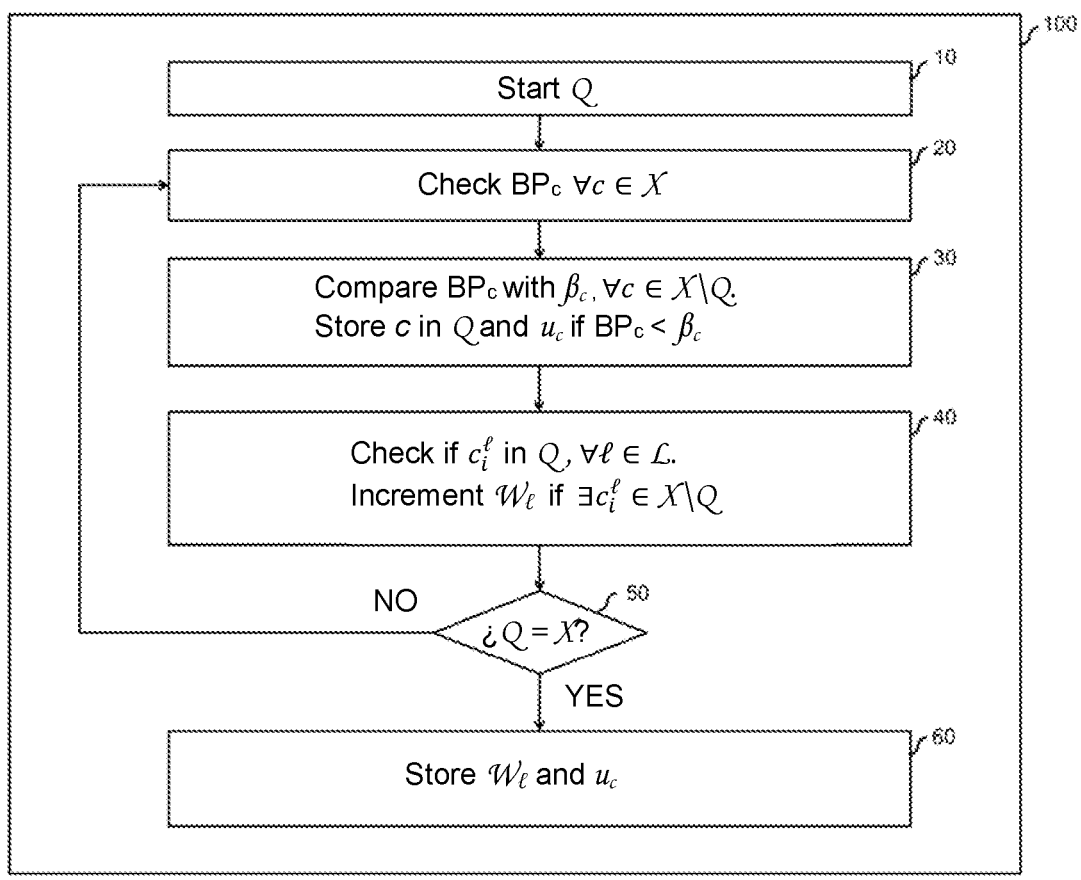
FIG. 2 shows a flow chart of a first embodiment of the method that is the object of the present invention.

The method that is the object of the present invention further comprises the step of determining, by means of said processor, a set of numbers of wavelengths for each link of said topology, wherein said number of wavelengths is determined in such a way that, for each connection of said set of connections, a blocking probability value corresponding to said connection is lower than the threshold value corresponding to said connection. The manner in which said processor determines said number of wavelengths corresponding to each link does not limit the scope of the present invention. In a preferred embodiment, without limiting the scope of the present invention, said set of numbers of wavelengths is determined by an algorithm comprising the steps of:
- starting each link with a number of wavelengths equal to 1;
- determining, by means of said processor, the blocking probability for each connection;
- determining, by means of said processor, for each link, if the blocking probability corresponding to each of the connections using said link is lower than the threshold value corresponding to said connection;
- increasing by 1 the number of wavelengths corresponding to a link if there is a connection that uses said link where the blocking probability is higher than its corresponding threshold value; and
- iteratively repeating the three previous steps A preferred embodiment of said algorithm, without limiting the scope of the present invention, is schematically illustrated in FIG. 2. First, the processor starts a set Q (10), which stores all those connections for which the condition that its blocking probability is lower than its threshold value has been satisfied. As it is evident for a person with average knowledge in the art, said set Q starts empty, since no connection has satisfied said condition.

After starting said set Q, and since each link l has a wavelength value equal to 1, the blocking probability $BP_c$ is calculated for each connection, c (20). The way in which said blocking probability is calculated does not limit the scope of the present invention and will depend on the specific application of the method that is the object of the present invention. However, illustratively and without limiting the scope of the present invention, it is understood that the exact calculation of said blocking probability entails a high computational cost, so any way of estimating said blocking probability may be implemented without limiting the scope of the present invention and the terms estimating said blocking probability and calculating said blocking probability will be used interchangeably.

In a preferred embodiment, said blocking probability is calculated using the algorithm published by Jara, et al in the article "*Blocking Evaluation and Wavelength Dimensioning of Dynamic WDM Networks without Wavelength Conversion*", published in Journal of optical communications and networking, Piscataway, N.J.; Washington, D.C.: IEEE: Optical Society of America, 2017, 9 (8), pp. 625-634.

In general, without limiting the scope of the present invention, said method for calculating said blocking probability comprises the steps of:
- defining a plurality of layers, each layer corresponding to the topology of said optical network, wherein the number of wavelengths available in each link is 0 or 1;
- determining, for each link of said optical network, the connections using said link;
- defining, for each connection using said link, a first numerical value, $t_{ON,c}$ corresponding to the time in which said connection is active, and a second numerical value, $t_{OFF,c}$, corresponding to the time in which said connection is inactive;
- defining a plurality of values $BL_{c,\ell}^w$ corresponding to the blocking probability of connection c on link l in layer w; and
- obtaining a value $BP_c$ corresponding to the blocking probability of connection c in the network.

In this method, without limiting the scope of the present invention, the traffic load corresponding to link c, $\varrho_c$, is calculated by the formula:

$$\varrho_c = \frac{t_{ON,c}}{t_{ON,c} + t_{OFF,c}}$$

In a more preferred embodiment, without limiting the scope of the present invention, said values $t_{ON,c}$ and $t_{OFF,c}$ correspond, for different connections c, to independent and identically distributed (i.i.d) random variables.

On the other hand, in another preferred embodiment, said value $BL_{c,\ell}^w$ is calculated by the formula:

$$BL_{c,\ell}^w = \frac{\phi^w - \phi_c^w}{1 - \phi^w - \phi_c^w}$$

wherein the values $\phi^w$ y $\phi_c^w$ are defined as follows:

$$\phi_c^w = \frac{t_{ON,c}}{t_{OFF,c}^w}$$

the value $t_{OFF,c}^w$ corresponding to the time in which connection c is active in layer w; and $$\phi^w = \sum_{c \in T_\ell} \phi_c^w$$

the value $T_\ell$ corresponding to the set of connections c that use link $\ell$ provided that the number of wavelengths available in link $\ell$ is equal to 1 in layer w.

Then, from these values $BL_{c,\ell}^w$, the blocking probability of connection c in layer w can be estimated by the formula:

$$BP_c^w = 1 - \prod_{\ell \in r_c} (1 - BL_{c,\ell}^w)$$

the value $r_c$ corresponding to the path that allows connection c, which allows obtaining the blocking probability of connection c in the network by the formula:

$$BP_c = \prod_w BP_c^w$$

In a more preferred embodiment, the calculation of the blocking probability is done iteratively. More particularly, without limiting the scope of the present invention, said iterative calculation is performed by iteratively repeating the steps of:

defining a plurality of values $BL_{c,\ell}^w$ corresponding to the blocking probability of connection c in link $\ell$, in layer w; and obtaining a value $BP_c$ corresponding to the blocking probability of connection c in the network from said values $BL_{c,\ell}^w$.

In order to obtain a convergent iteration, once the algorithm has been implemented for the first time, the values $t_{OFF,c}^w$ are updated using the following formulas:

$$t_{OFF,c}^1 = t_{OFF,c} + BP_c^1(t_{ON,c} + t_{OFF,c}) - t_{ON,c} \prod_k BP_c^k$$

$$t_{OFF,c}^{w+1} = t_{OFF,C}^{w-1} + (t_{ON,c} + t_{OFF,c}) \sum_{m=1}^{w-1} \left(\frac{1}{BP_c^m} - 1\right)$$

After finding said blocking probability $BP_c$ for each connection c, these values $BP_c$ are compared with the corresponding threshold values of connection c (30), provided that said connection c is not in the set Q (or, equivalently, that said connection c is in the set X\Q). If, for a specific connection c, it is true that $BP_c$ is lower than the threshold value $\beta_c$, said connection c is stored in the set Q and the number of wavelengths available in the links that are part of the route $r_c$ is stored as the $u_c$ value.

Then, for each link, $\ell$, it is evaluated whether the connections using that link have satisfied the condition $BP_c < \beta_c$ (40). If there is any link that has not satisfied the previous condition, the number of wavelengths available in said link is increased by 1. Subsequently, it is verified whether the set Q is equal to the set X (50), that is, it is verified whether all connections c have satisfied the condition $BP_c < \beta_c$. If there is any difference between said set Q and set X, the steps of calculating the blocking probability $BP_c$ are repeated for each connection c (20); comparing said $BP_c$ values with the corresponding threshold values of connection c (30) and storing in the set Q those connections that have satisfied said condition; evaluating if the connections that use each link, l, have satisfied the condition $BP_c < \beta_c$ (40) and increasing the number of wavelengths available in a link if there is any connection c using said link and has not satisfied its condition; and verifying if the set Q is equal to the set X (50). On the other hand, if it is verified that the set Q is equal to the set X, that is, that all the connections have satisfied their operating condition, the number of wavelengths available for each link, $\mathcal{W}_\ell$, and the number of wavelengths required for each connection, $u_c$ (60) are stored.

In this way, the method that is the object of the present invention presents a series of advantages with respect to other methods of implementation of optical networks known in the state of the art, without limiting the scope of the present invention.

First, the method naturally assigns a different number of wavelengths to each link in the network (commonly referred to as heterogeneous dimensioning). The criterion for assigning the number of wavelengths in each link is that the blocking probability of each connection does not exceed a threshold value which may be, for example and without limiting the scope of the present invention, defined in a Service Level Agreement (or SLA).

Second, the method naturally assigns to each connection a number of wavelengths that allows that the blocking probability of said connection be as close as possible to the corresponding threshold value, thus avoiding an over dimensioning of the network.

Third, as a consequence of the above, the method naturally allows dimensioning the network to serve connections with different threshold values, that is, the method allows to solve the network dimensioning problem when there are classes of users with different service level agreements.

The invention claimed is:

1. A method for implementing a WDM optical network with wavelength continuity constraint, CHARACTERIZED in that it comprises the steps of:

obtaining, in a processor, the topology of said WDM optical network, said topology including nodes and links in said optical network;

obtaining, in said processor, a set of connections in said WDM optical network and a set of threshold values for each connection of said set of connections;

obtaining, by means of said processor, a set of routes that allow satisfying said set of connections in said topology of said WDM optical network;

determining, by means of said processor, a set of numbers of wavelengths for each link of said topology, wherein said number of wavelengths is determined in such a way that, for each connection of said set of connections, a blocking probability value corresponding to said connection is lower than the threshold value corresponding to said connection; and implementing said optical network according to said set of numbers of wavelengths, wherein said set of numbers of wavelengths is determined by the steps of:

starting each link with a number of wavelengths equal to 1;

determining, by means of said processor, the blocking probability for each connection;

determining, by means of said processor, for each link, if the blocking probability corresponding to each of the connections using said link is lower than the threshold value corresponding to said connection;

increasing by 1 the number of wavelengths corresponding to a link if there is a connection that uses said link where the blocking probability is higher than its corresponding threshold value; and iteratively repeating the three previous steps.

2. The method of claim 1, CHARACTERIZED in that it further comprises storing the number of wavelengths required for each connection of said set of connections.

3. The method of claim 1, CHARACTERIZED in that it further comprises storing the number of wavelengths required for each link of said optical network.

4. The method of claim 1, CHARACTERIZED in that said set of routes is determined using the Dijkstra algorithm.

5. The method of claim 1, CHARACTERIZED in that, for determining said blocking probability, said processor executes the steps of:

defining a plurality of layers, each layer corresponding to the topology of said optical network, wherein the number of wavelengths available in each link is 0 or 1;

determining, for each link of said optical network, the connections using said link;

defining, for each connection using said link, a first numerical value, $t_{ON,c}$ corresponding to the time in which said connection is active, and a second numerical value, $t_{OFF,c}$, corresponding to the time in which said connection is inactive;

defining a plurality of values $BL_{c,\ell}^{w}$ corresponding to the blocking probability of connection c in link $\ell$, in layer w; and obtaining a value $BP_c$ corresponding to the blocking probability of connection c in the network from said values $BL_{c,\ell}^{w}$.

6. The method of claim 5, CHARACTERIZED in that said steps of defining a value $BL_{c,\ell}^{w}$ and obtaining a value $BP_c$ are performed iteratively.

\* \* \* \* \*